United States Patent
Namboodiri et al.

(10) Patent No.: US 10,824,621 B2
(45) Date of Patent: Nov. 3, 2020

(54) OPEN QUERY LANGUAGE

(71) Applicants: Vipin Namboodiri, Karnataka (IN); Phalguni Mukherjee, West Bengal (IN)

(72) Inventors: Vipin Namboodiri, Karnataka (IN); Phalguni Mukherjee, West Bengal (IN)

(73) Assignee: Ricoh Co., Ltd., Tokyo (JP)

( * ) Notice: Subject to any disclaimer, the term of this patent is extended or adjusted under 35 U.S.C. 154(b) by 490 days.

(21) Appl. No.: 15/067,039

(22) Filed: Mar. 10, 2016

(65) Prior Publication Data

US 2017/0262501 A1 Sep. 14, 2017

(51) Int. Cl.
*G06F 7/00* (2006.01)
*G06F 16/2453* (2019.01)
*G06F 16/242* (2019.01)

(52) U.S. Cl.
CPC ...... *G06F 16/24537* (2019.01); *G06F 16/243* (2019.01); *G06F 16/2433* (2019.01); *G06F 16/24534* (2019.01); *G06F 16/24542* (2019.01)

(58) Field of Classification Search
CPC .................................................. G06F 16/243
USPC ........................................................ 707/718
See application file for complete search history.

(56) References Cited

U.S. PATENT DOCUMENTS

| | | | | |
|---|---|---|---|---|
| 9,223,612 | B1 * | 12/2015 | Feldman | G06F 9/465 |
| 2001/0032029 | A1 * | 10/2001 | Kauffman | G06Q 10/06316 700/99 |
| 2004/0218618 | A1 * | 11/2004 | Asami | H04H 60/06 370/432 |
| 2007/0050328 | A1 * | 3/2007 | Li | G06F 16/9032 |
| 2010/0121868 | A1 * | 5/2010 | Biannic | G06F 16/242 707/759 |
| 2010/0306249 | A1 * | 12/2010 | Hill | G06Q 50/01 707/769 |
| 2012/0198838 | A1 * | 8/2012 | Bruck | F01N 3/035 60/605.1 |
| 2014/0249804 | A1 * | 9/2014 | Jackson | G06F 17/28 704/9 |
| 2014/0279941 | A1 * | 9/2014 | Atkisson | G06F 16/2365 707/690 |
| 2015/0363522 | A1 * | 12/2015 | Maurya | H04L 43/50 703/13 |
| 2016/0028764 | A1 * | 1/2016 | Vasseur | H04L 63/1416 726/23 |
| 2019/0007326 | A1 * | 1/2019 | Clemm | H04L 41/0681 |
| 2019/0334759 | A1 * | 10/2019 | Ray | H04L 43/04 |

OTHER PUBLICATIONS

Examination Report for Indian Application No. 201714006945, dated Jul. 7, 2020, 8 pgs.

* cited by examiner

*Primary Examiner* — Eliyah S. Harper
(74) *Attorney, Agent, or Firm* — Patent Law Works LLP (57) ABSTRACT

The disclosure includes a system and method for generating a platform independent response to an input query. A query parsing application receives an input query from a user, generates an intermediate query token from the input query, converts the intermediate query token to a destination specific query, receives a response to the destination specific query, and formats the response to the destination specific query to generate a platform independent response to the input query.

20 Claims, 7 Drawing Sheets

OPEN QUERY LANGUAGE

BACKGROUND

1. Field of the Invention

The specification generally relates to data querying. In particular, the specification relates to a system and method for translating an input query to a destination specific query.

2. Description of the Background Art

With a growing number of systems being computer controlled and/or assisted, software has become more and more complex. For example, an application developer has to interface with an ever increasing set of services and/or databases to realize a solution/workflow. Further, a significant proportion of software product development and maintenance efforts are spent learning newer interfaces. This results in increased turn-around times, impacts productivity (as application developers have to learn multiple interface semantics), is error prone, and also reduces the overall quality and maintainability of the product. Furthermore, this also results in a prohibitive barrier for the software development team to seamlessly migrate from one service/database to another. Many innovations in service interfaces and databases have been necessitated by application requirements. Thus, it becomes necessary to provide services and/or data access in a unified, structured way, such that access to a data center is provided through one interface.

SUMMARY

The techniques introduced herein overcome the deficiencies and limitations of the prior art, at least in part, with a system and method for generating a platform independent response to an input query. In one embodiment, the system includes a query parsing application. The query parsing application is configured to receive an input query from a user. The query parsing application is further configured to generate an intermediate query token from the input query. The query parsing application is further configured to convert the intermediate query token to a destination specific query. The query parsing application is further configured to receive a response to the destination specific query. The query parsing application is further configured to format the response to the destination specific query and generate a platform independent response to the input query.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

The techniques introduced herein address the problem of interfacing with multiple services and/or databases by providing a single interface that integrates various types of application programming interfaces (APIs) and database interfaces in a simple and new way. The techniques introduced herein may be used to integrate APIs/query interfaces with a wide variety of databases, business logic implementation, and analytic frameworks. The techniques allow integration of APIs/queries by keeping object relationships and distinct from attributes. Additionally, the techniques provide improved quality of service (qos) primitives for write, read, performance, and latency etc. Further, the techniques introduced herein provide sufficient flexibility such that the query integration may be implemented on a client device or a server.

Figure 1:
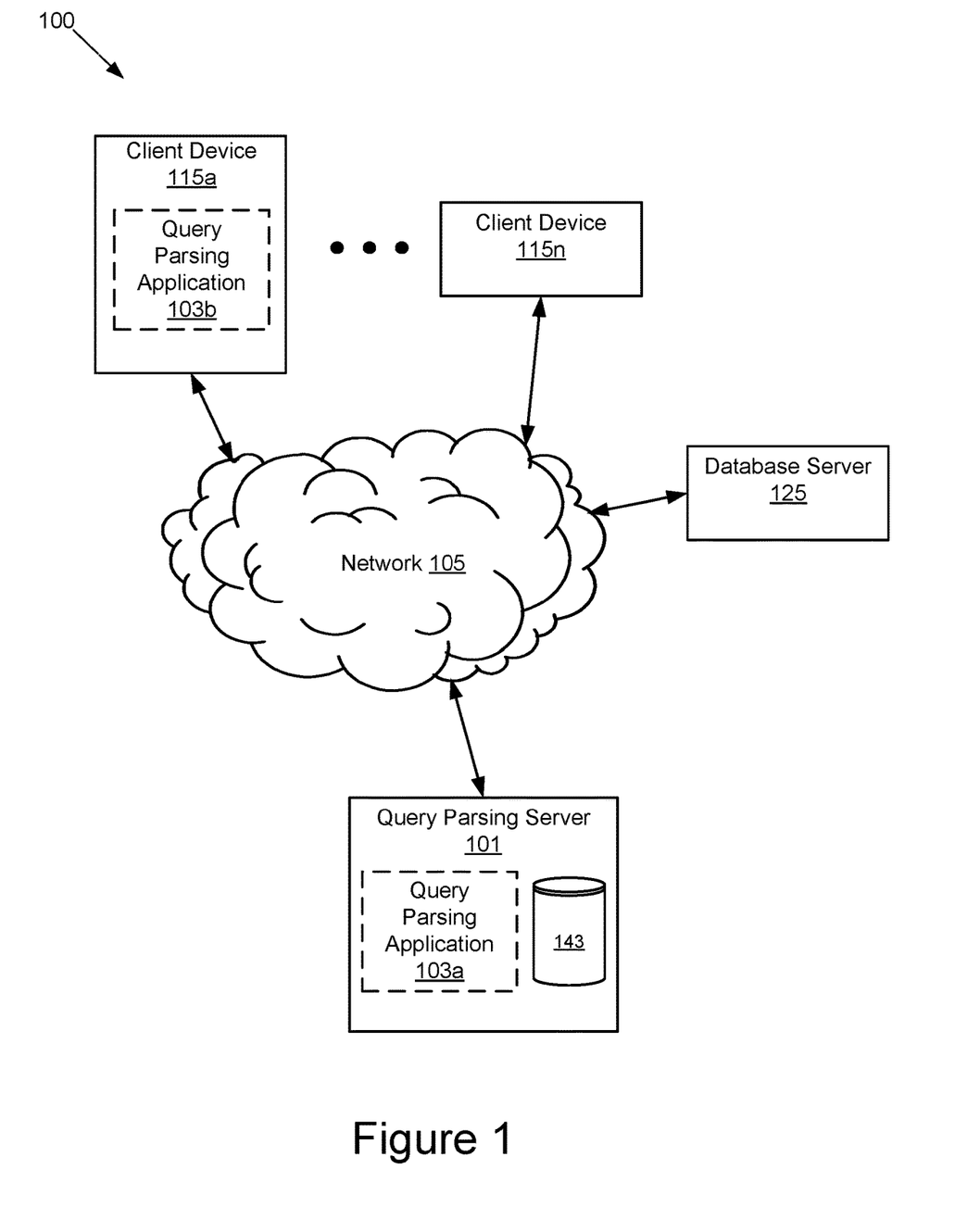
FIG. 1 depicts a high-level block diagram illustrating one embodiment of a system for generating a platform independent response to an input query.

FIG. 1 is a high-level block diagram illustrating one embodiment of a system 100 for generating a platform independent response to an input query. The illustrated system 100 may have client devices 115a . . . 115n that can be accessed by users, a database server 125 and a query parsing server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115, the database server 125 and the query parsing server 101, in practice one or more networks 105 can be connected to these entities.

In one embodiment, the system 100 includes a query parsing server 101 coupled to the network 105. In some embodiments, the query parsing server 101 may be either a hardware server, a software server, or a combination of software and hardware. The query parsing server 101 may be, or may be implemented by, a computing device including a processor, a memory, applications, a database, and network communication capabilities. In the example of FIG. 1, the components of the query parsing server 101 are configured to implement a query parsing application 103*a* described in more detail below. In one embodiment, the query parsing server 101 generates a platform independent response to an input query. While the examples herein describe translating an input query to a database specific query, it should be understood that it is applicable to a wide variety of databases, business logic implementation and analytic frameworks. Similarly, the method for generating a platform independent response to the input query is a deploy anywhere architecture, i.e. the method is capable of performing a client side parsing or can reside on the cloud and be accessed through JSON (JavaScript Object Notation), or some other communication method.

In some embodiments, the query parsing server 101 sends and receives data to and from other entities of the system 100 via the network 105. For example, the query parsing server 101 sends and receives data including an input query to and from the client device 115. The input query received by the query parsing server 101 can include an input query from a user or an application at the client device 115. Although only a single query parsing server 101 is shown in FIG. 1, it should be understood that there may be any number of query parsing server 101 or a server cluster.

In some embodiments, the system 100 includes a database server 125 coupled to the network 105. In some embodiments, the database server 125 may be either a hardware server, a software server, or a combination of software and hardware. The database server 125 may be, or may be implemented by, a computing device including a processor, a memory, applications, a database, and network communication capabilities. The database server 125 may be configured to store different databases. For example, the database server 125 may be configured to store relational databases, key/value data bases, document oriented databases, graphical databases, and many others. Although only a single database server 125 is shown in FIG. 1, it should be understood that there may be any number of database servers 125 or a server cluster. Further, while the example of FIG. 1 depicts a database server 125, the application context is not limited to data services but may be implemented over many services as well (e.g., OpenQL based system implementation for services such as audit logging and monitoring, scheduling, and external third party service APIs such as snomedct name server, e-prescription server, medical coding, etc.

The client device 115 may be a computing device that includes a memory and a processor, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. The client device 115 includes a display for viewing information provided by the query parsing server 101. While FIG. 1 illustrates two client devices 115*a* and 115*n*, the disclosure applies to a system architecture having one or more client devices 115.

The client device 115 is adapted to send and receive data to and from the query parsing server 101. For example, the client device 115 sends an input query to the query parsing server 101 and the query parsing server 101 provides a response to the input query in JSON format to the client device 115.

The query parsing application 103 may include software and/or logic to provide the functionality for generating a platform independent response to an input query, among other things. In some embodiments, the query parsing application 103 can be implemented using programmable or specialized hardware. In some embodiments, the query parsing application 103 can be implemented using a combination of hardware and software. In other embodiments, the query parsing application 103 may be stored and executed on a combination of the client devices 115 and the query parsing server 101, or by any one of the client devices 115 or query parsing server 101. The operation of the query parsing application 103 and the functions listed above are described below in more detail below with reference to FIGS. 3-6.

In some embodiments, the query parsing application 103 receives an input query from a user. The query parsing application 103 generates an intermediate query token from the input query. The query parsing application 103 converts the intermediate query token to a destination specific query. As used herein, a destination specific query is a query formatted in a language specific to a destination database. For example, the query parsing application 103 converts the intermediate query token to a query specific to the destination database. The query parsing application 103 formats a response to the destination specific query to generate a platform independent response to the input query. For example, the query parsing application 103 formats the response in a unified format easily comprehended by the client device 115. In some embodiments, the platform independent response can be a response to the destination specific query in a unified JSON format. The query parsing application 103 outputs the platform independent response to the client device 115.

The techniques described herein is an approach to address the problem of complex structured and unstructured data querying in a unified manner, so that application developers can focus on the core logic and perfect it over a period of time rather than be bogged down by the need to learn newer interfaces. This advantageously results in enhanced productivity, improved quality and shorter product offering turn-around times. Furthermore, the user can migrate from one database to another or even add a new database to the offering without having the user go through a learning path.

While the examples herein describe transformation of input query to a database specific query, it should be understood that the destination specific query may be applicable to any business logic implementation and analytic framework.

Figure 2:
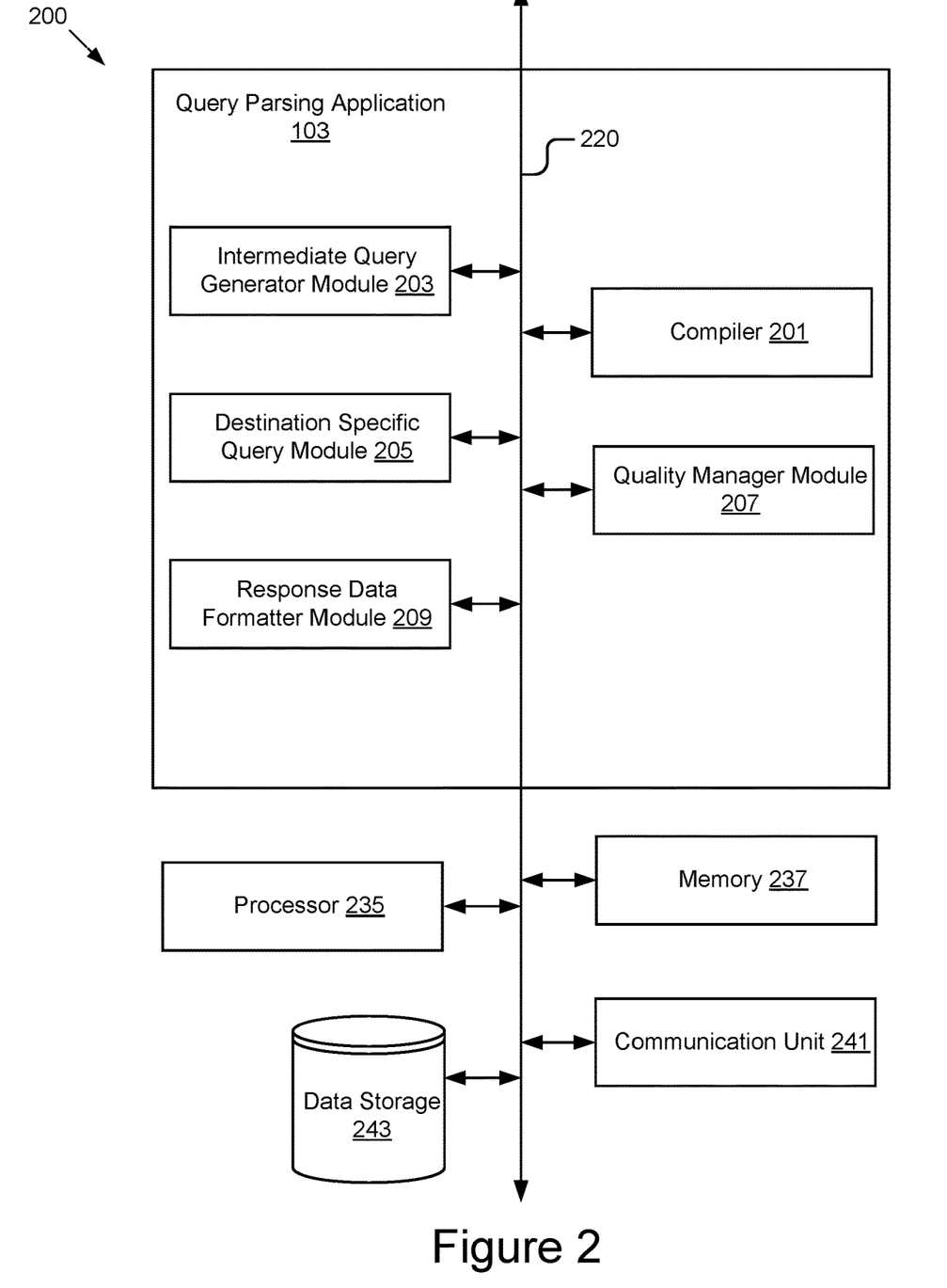
FIG. 2 depicts a block diagram illustrating one embodiment of a computing device including a query parsing application.

FIG. 2 is a block diagram illustrating one embodiment of a computing device 200 including a query parsing application 103. The computing device 200 may also include a processor 235, a memory 237, a communication unit 241, and data storage 243 according to some examples. The components of the system 200 are communicatively coupled to a bus or software communication mechanism 220 for communication with each other. In some embodiments, the computing device 200 may be a client device 115, a query parsing server 101, a database server 125 or a combination of a client device 115, a query parsing server 101 and a database server 125.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of doing a client side parsing operation. In some implementations, the processor 35 may be coupled to the memory 237 via the bus 220 to access data and instructions therefrom and store data therein. The bus 220 may couple the processor 235 to the other components of the computing device 200 including, for example, the memory 237, the communication unit 241, the query parsing application 103, and the data storage 243. It will be apparent to one skilled in the art that other processors, operating systems, sensors, displays and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the query parsing application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The communication unit 241 is hardware for receiving and transmitting data by linking the processor 235 to the network 105 and other processing systems. The communication unit 241 receives data such as requests from the client device 115 and transmits the requests to the compiler 201. The request may be, for example a request to generate a platform independent response to the input query. The communication unit 241 also transmits information including the platform independent response to the client device 115 for display, for example, in response to receiving a response to the destination specific query. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data for different types of databases and different sets of APIs for each database. The data can be used for generating an intermediate query token from the input query received from the client device 115. In some embodiments, the data storage 243 may store data for business logic implementation and analytic frameworks. An input query can be a query in any database access language. The data storage 243 may store parser tokens, a parse tree and an intermediate query token for the input query. The data storage 243 may also include a plurality of database specific attributes.

The data storage 243 may store other information that is used to provide functionality as described herein. For example, the data storage 243 may store quality of service requirements for an input query, a plurality of translation rules associated with various databases, etc. The data stored in the data storage 243 is described below in more detail.

In some embodiments, the query parsing application 103 may include a compiler 201, an intermediate query generator module 203, a destination specific query module 205, a quality manager module 207, and a response data formatter module 209. The components of the query parsing application 103 are communicatively coupled via the bus 220. The components of the query parsing application may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 235. In some embodiments, the components are instructions executable by the processor 235. In some implementations, the components are stored in the memory 237 and are accessible and executable by the processor 235.

The compiler 201 may include software and/or logic to transform input query written in a first database access language into a second database access language. The compiler 201 is the first phase of query transformation, where the query passes through different layers of the compiler as explained with reference to FIGS. 3-5.

Figure 3:
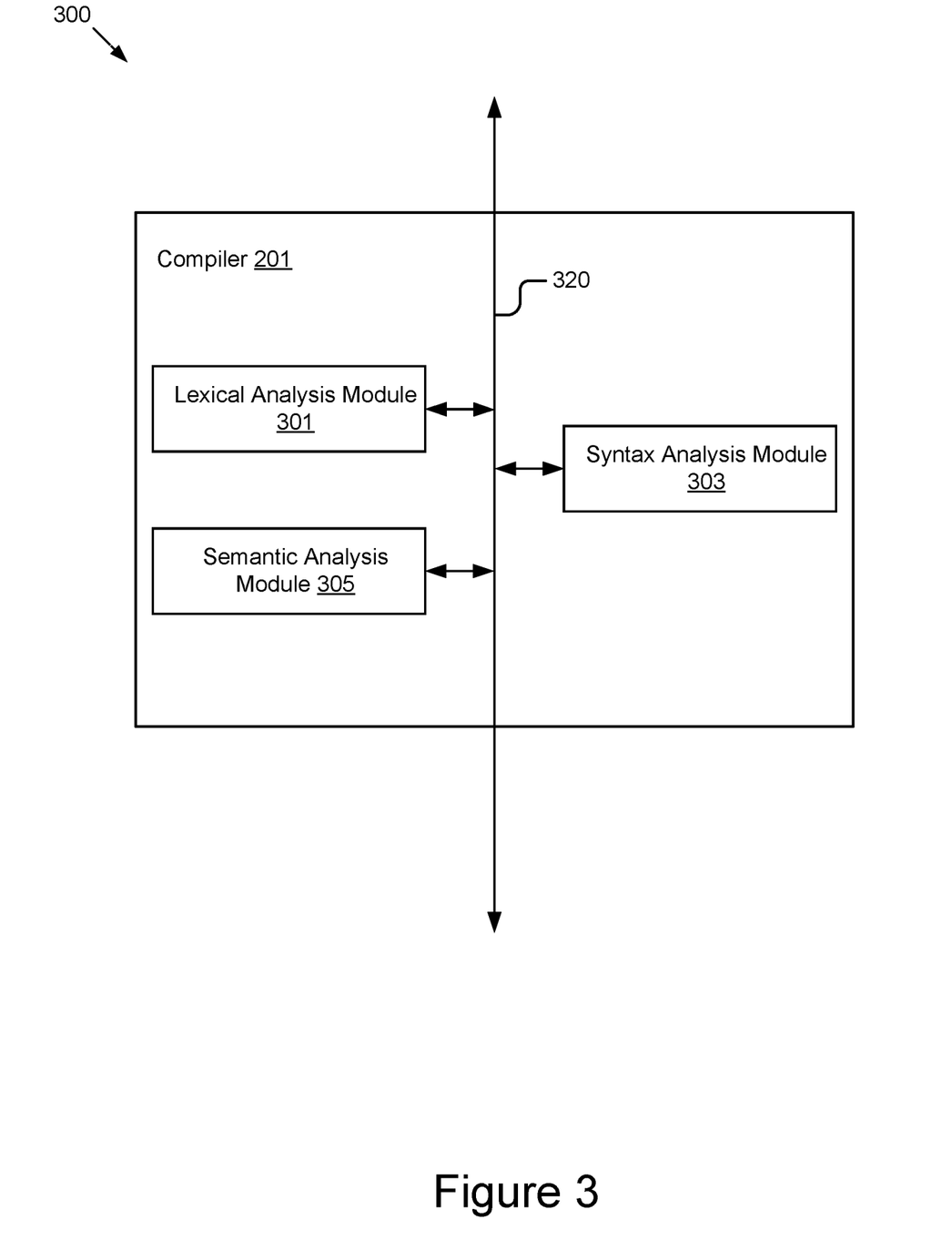
FIG. 3 depicts a block diagram illustrating one embodiment of a compiler.

FIG. 3 is a block diagram illustrating one embodiment of a compiler 201. The compiler 201 may include a lexical analysis module 301, a syntax analysis module 303, and a semantic analysis module 305, according to some embodiments. The components of the compiler 201 are communicatively coupled by a bus or software communication mechanism 320.

The lexical analysis module 301 may include software and/or logic for identifying valid words in an input query. The lexical analysis module 301 is the interface of the compiler to the outside world. In some embodiments, the lexical analysis module 301 may convert a sequence of characters in an input query into a sequence of tokens. In some embodiments, the lexical analysis module 301 generates a parser token using the valid words identified in the input query. For example, the lexical analysis module 301 is able to recognize the small syntactic units (parser tokens) from the input query and send this information to the syntax analysis module 303. In an alternative embodiment, the lexical analysis module 301 also performs the additional job of removing cosmetics like extra white space, from the input query. For example, for the input query of "select 'A.name' from App A," the lexical analysis module 301 identifies the following example words.

```
select
A
.
name
from
App
A
```

Figure 4A:
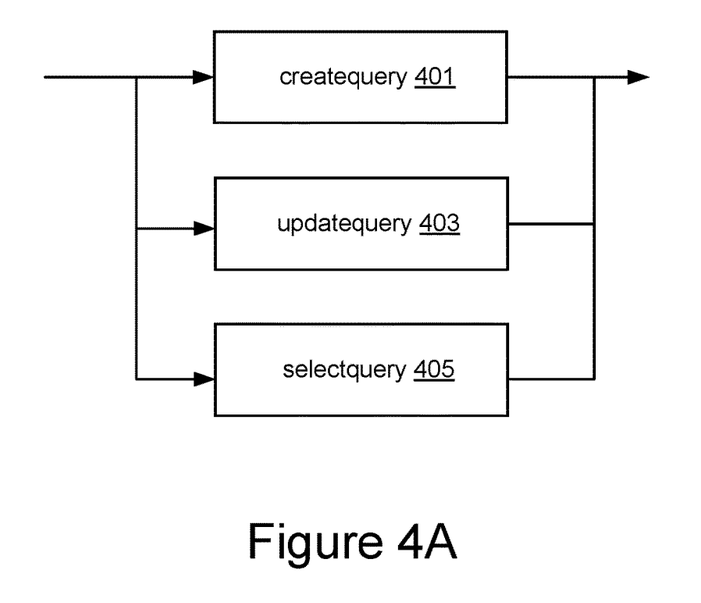
FIGS. 4A and 4B depict graphical representations of one embodiment of a parser token extraction process.
Figure 4B:
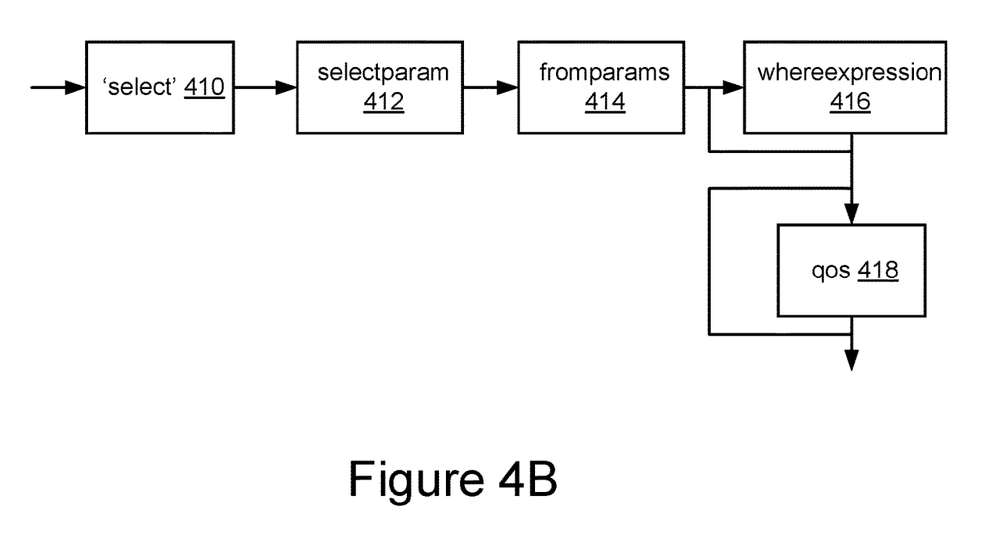

FIGS. 4A and 4B are graphical representations of a parser token extraction process. In the example of FIG. 4A, the lexical analysis module 301 determines that the input query must satisfy one of the grammars of "createquery" 401, "updatequery" 403, or "selectquery" 405. For example, upon receiving an input query from a user, the lexical analysis module 301 determines if the query satisfies one of the grammars of "createquery" 401, "updatequery" 403, or "selectquery" 405. The lexical analysis module 301 identifies valid words in the input query and matches it to the grammar of the query to determine the query type. In the example of the query "select 'A.name' from App A," the lexical analysis module 301 matches the valid word "select" to the grammar "selectquery" 405.

FIG. 4B is a graphical representation of the abstract grammar of a "select" query. The lexical analysis module 301 determines the abstract grammar of the "select" query, which starts with the token "select" 410 followed by the "selectparam" 412 "fromparams" 414 grammar, followed by the "whereexpression" 416, and "qos" 418. As used herein, selectparam 412 indicates a "select" parameter and fromparams 414 is used to indicate from parameters used to generate the intermediate query token. Further, whereexpression 416 is used to indicate a where expression component of the intermediate query token. Finally, qos 418 is a quality of service parameter. In some embodiments, the lexical analysis module 301 searches for a user defined quality of service parameter. Referring back to the example query of "select 'A.name' from App A," the lexical analysis module 301 determines the "selectparam" 412 to be "A.name" and the "fromparams" 414 to be "App A." As indicated in the example of FIG. 4B, the whereexpression 416 and qos 418 may be optional parameters in the intermediate query token.

The syntax analysis module 303 may include software and/or logic for validating that the parser tokens are syntactically correct. The syntax analysis module 303 is the interface of the compiler to the lexical analysis module 301 and receives parser tokens from the lexical analysis module 301. In some embodiments, the syntax analysis module 303 may validate that the parser tokens generated by the lexical analysis module 301 are syntactically correct as per the grammar. For example, the syntax analysis module 303 checks a parser token arrangement against the input query grammar, i.e. the syntax analysis module 303 checks if the expression made by the parser tokens is syntactically correct. In some embodiments, the syntax analysis module 303 builds a parse tree using the parser tokens generated by the lexical analysis module 301. For example, the parse trees are used to show the structure of the input query. In some embodiments, the syntax analysis module 303 traverses the parse tree using three different forms of traversal—preorder traversal, inorder traversal, and postorder traversal. In an alternative embodiment, the syntax analysis module 303 also determines whether the input query has as the right shape/form. For example, the parse tree for the input query of "select 'A.name' from App A," is described with reference to FIG. 5.

Figure 5:
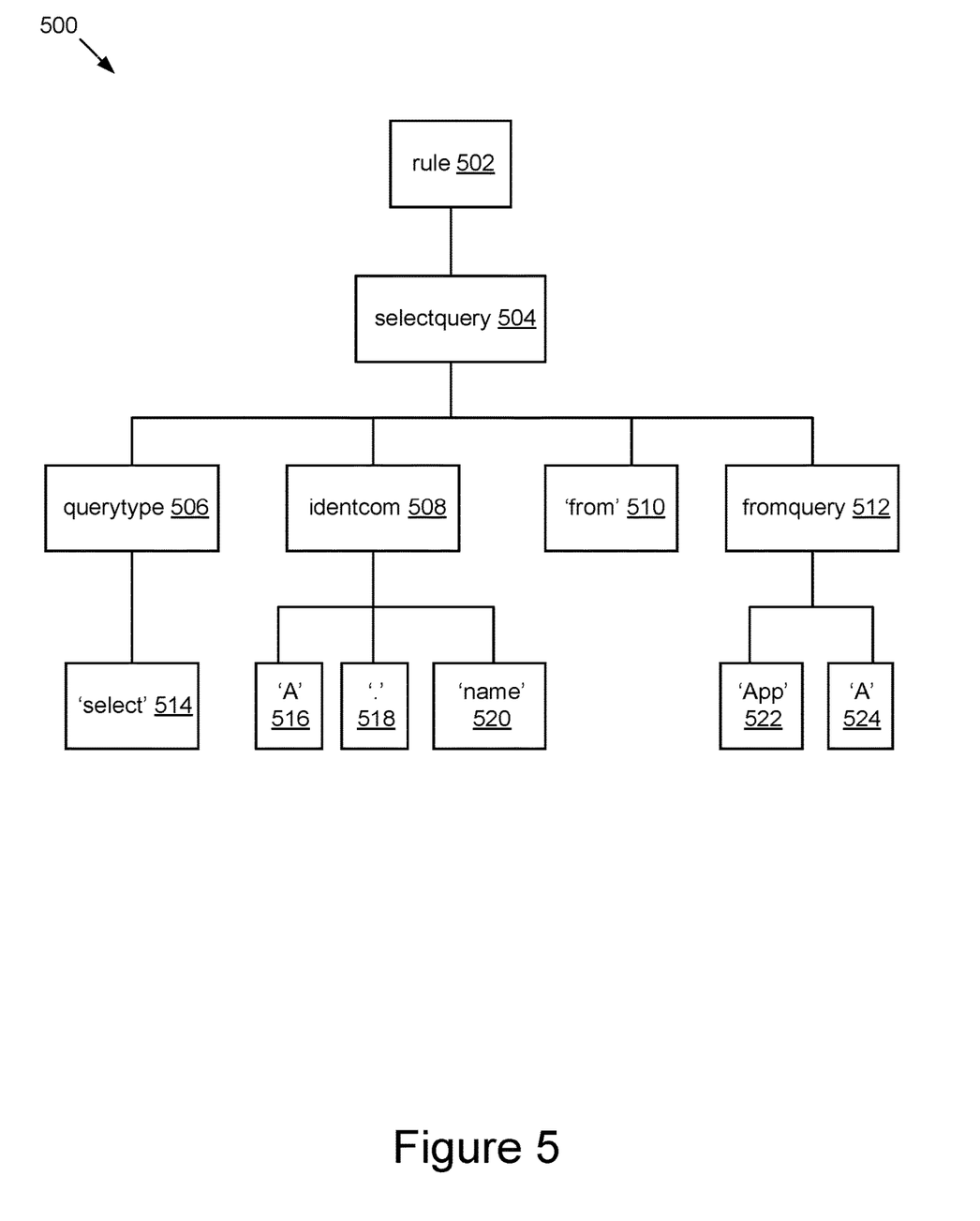
FIG. 5 depicts a graphical representation of one embodiment of a parse tree.

FIG. 5 is a graphical representation of a parse tree. The syntax analysis module 303 builds a parse tree for the input query "select 'A.name' from App A." The syntax analysis module 303 starts with identifying the rule included in the input query. In some embodiments, the rule is identified by the lexical analysis module 301. In the example of the input query "select 'A.name' from App A," the syntax analysis module 303 identifies the rule as "selectquery." Next, the syntax analysis module 303 identifies a "querytype," "identcom," "fromquery" followed by any identified valid words. In the example input query "select 'A.name' from App A", the syntax analysis module 303 identifies the "querytype" as "select," the "identcom" as "A.name," and the "fromquery" as "App A."

The semantic analysis module 305 may include software and/or logic for performing semantic validation of the input query. For example, the semantic analysis module 305 throws an error if the input query queries "select A.name" without defining the type of A. The semantic analysis module 305 receives input as the parser token from the lexical analysis module 301. In some embodiments, the semantic analysis module 305 may check aspects of the input query, that are not related to the syntactic form, or that are not easily determined during parsing. In some embodiments, the semantic analysis module 305 checks whether the parse tree constructed by the syntax analysis module 303 follows the rules of database access language. For example, the semantic analysis module 305 determines whether the assignment of values in the input query is between compatible data types.

In some embodiments, the semantic analysis module 305 keeps track of types and expressions of identifiers in the input query. The semantic analysis module 305 also determines whether identifiers are declared before their use in the input query. In some embodiments, the semantic analysis module 305 can be configured to perform static semantic analysis. The static semantic analysis include one or more from (a) type checking, (b) checking if every variable is declared before used, (c) checking that identifiers are used in appropriate contexts, (d) checking subroutine call arguments, and (e) checking labels. In some embodiments, the semantic analysis module 305 can be configured to perform dynamic semantic analysis. The dynamic semantic analysis is performed at run time and include one or more from (a) checking that array subscript values are within bounds, (b) checking for arithmetic errors, e.g. division by zero, (c) checking that pointers are not dereferenced unless pointing to valid object, (d) checking for a variable that is used but hasn't been initialized, and (e) checking that when a check fails at run time, an exception is raised.

An example algorithm for semantic analysis to differentiate between attribute and relation can be described by the following algorithm.

```
INPUT: = [DOT-SEPARATED-PARAM], OBJECT-TYPE [ ]
INPUT-ARR [ ]:= INPUT. Split (".");
If(! OBJECT-TYPE. Contains (INPUT-ARR [0]) ) THROW Exception:
"Invalid Input"
for i:=1 to INPUT-ARR. length:
        If OBJECT-TYPE. Contains (INPUT-ARR[i])
        "Mark-as-Relation"
        Else "Mark-as-Attribute"
End for
```

The algorithm implements that for each parameter "dot-separated," the first attribute must be an object type, if it's not the semantic analysis module 305 throws an error. For each subsequent attribute, if the type of object is defined, it is treated as object within an object. For example, in the input query "select 'A.name' from App A," "A.name" is "dot-separated."

Referring back to FIG. 2, the intermediate query generator module 203 may include software and/or logic for identifying valid words in an input query. The intermediate query generator module 203 is converts the input query into an internal standard structure, from which different destination based queries are given shape. For example the input query "select 'A.name' from App A" is converted into an intermediate query token "params#A.name fromquery#App:A". The intermediate query generator module 203 represents a program for an abstract machine. For example, the intermediate query generator module 203 translates the input query to generate a query which is easily translated into a destination specific query. In some embodiments, the intermediate query generator module 203 converts the parser tokens generated by the lexical analysis module 301 to generate intermediate query tokens.

The destination specific query module 205 may include software and/or logic to convert the intermediate query tokens to a destination specific query. In some embodiments, the destination specific query is a database specific query. In some embodiments, the destination specific query module 205 maps the object in the input query to one or more concepts in one or more databases. In some embodiments, the destination specific query module 205 interacts with the quality manager module 207 to ensure that the destination specific query meets a quality of service. In some embodiments, the destination specific query module 205 receives a response to the destination specific query and sends the response to the response data formatter module 209 for formatting.

The quality manager module 207 may include software and/or logic to determine a quality of service for the destination specific query. In some embodiments, the quality manager module 207 determines a read quality and a write quality for the destination specific query. In some embodiments, the quality manager module 207 includes three categories of quality of service—low, high and medium. For example, the quality manager module 207 determines whether the quality of service is low, high or medium for an input query including a read operation and an input query including a write operation. The quality manager module 207 mainly denotes write operation in case of CREATE query and UPDATE query and denotes read operation in case of SELECT query. In some embodiments, the quality manager module 207 has a default value set to "LOW," but the quality manager module 207 can be configurable to any other quality of service value. The quality of service is advantageous because it takes care of read and write latencies during query translation.

In some embodiments, the quality manager module 207 determines that a quality of service for a read operation has three categories—low, medium and high. The quality of service "low" for a read operation mainly indicates that it gives the preference of "Read Your Own Write." For example, during execution of a query, the quality manager module 207 is guaranteed to see the writes it has made when it does reads. This has a different meaning for different databases, for example in the case of a relational database, this means return of in-memory data from process previous save point. In case of NoSQL database like MongoDB, the database makes sure to acknowledge all user writes to at least to the primary server so that the user is guaranteed to get its write till the primary server is up. In some embodiments, "low" quality of service may lead to failed read operation.

In some embodiments, a read operation with "medium" quality of service tries to read the latest updated data from the primary server first. In the case of a relational database, the read operation process tries to read data from the primary database and if the process is unable to access the primary database, the process returns data from a previous save point of a user. In the case of a NoSQL database the read operation process tries to read the data from the primary server. If the primary server is down, the process returns the data of one of the secondary servers.

In some embodiments, a "high" quality of service for a read operation guarantees the latest data to the process. For example, the read operation process with "high" quality of service first tries to read the primary server, and if the primary server is down, the process tries to read one of the nearest secondary servers which is synced up to a threshold time. If none of the servers is available the process returns an error message to the user.

In some embodiments, the quality manager module 207 determines that a quality of service for a write operation has three categories—low, medium and high. The quality of service "low" for a write operation indicates that it is a "write-and-forget." For example, user writes are sent to the database, but no guarantee writes will be committed by the write operation. In some embodiment, a "medium" quality of service means writes are written to the primary server. For example, in case of a NoSQL database, the write operation waits for acknowledgement per write and the quality manager 207 throws an error if an acknowledgement is missing. In the case of a relational database, a new save point is created in memory and a flush of the data is attempted. In some embodiments, a "high" quality of service means the write operation makes sure writes are made to the minimum number of servers configured by the user. Otherwise, the write operation reports an error.

The response data formatter module 209 may include software and/or logic to format the response to the destination specific query to generate a platform independent response to the input query. In some embodiments, the response data formatter module 209 receives the response to the destination query from the destination specific query module 205. In some embodiments, the response data formatter module 209 receives the response to the destination query in a destination specific language. For example, if the destination specific query is directed towards a particular type of database, then the response to the destination specific query will be in a format compatible with the particular type of database. In some embodiments, the response data formatter module 209 generates the response to the input query in a unified form. The response data formatter module 209 is responsible to format data in a unique form from different sources and sends it back to the user. For example, the response data formatter module 209 response may be in a JSON format, which includes a set of properties and values. In one embodiment, the general response structure may be {"data":[{<key>:<value>, . . . },{<key>:<value>}]}.

In some embodiments, the query skeleton for different queries may be as follows:

```
Read Query:
select [<refvar>.<property>,<refvar>.<property>... ] from [
(<Object Type> <refvar>),( <Object Type> <refvar>)...] where
<wherequery > [optional]
Create Query:
create <Object Type> <Object Var> | [<Object Var>.<ObjectVar>=value]
with values {param1:value1,param2:value2...}(Optional) from [
(<Object Type> <refvar>),( <Object Type>
<refvar>)....](Optional)
where<condition>(optional)
Update Query:
update [<Object Type> <ObjectVar>,<Object Type> <ObjectVar>...]
Set [< ObjectVar>.<property>=<value>,<ObjectVar>.<property>=
<value>,...]
Where [wherequery][optional]
```

The following illustrates an example method of mapping the input query to different destination specific queries. In this example, different destinations are different databases and an object defined as "App A" can be mapped as follows:

| OPEN QL | Object App |
| --- | --- |
| MongoDB | Collection App |
| Neo4j | Node/Relation App |
| Relational | Table App |
| HIVE | Data Warehouse App |

The following example describes an input query to format the property "name" of an object of type "App" whose status is 1. In some embodiments, the input query can be formulated as "Select A.name from App A where A.status=1." In this example "name" and "status" are properties of object A which is of type App. In some embodiments, the input query is converted as follows in different databases:
MongoDB: db.App.find({status:1},{name:1})
Neo4j: MATCH (A:App) WHERE A.status=1 RETURN A.name
SQL: select name from App where status=2
HIVE: select name from App where status=2
In this example, the formatted response to the destination specific query is an array of objects with a property name and unique ID. The formatted response in this example can be {"data":[{id:1,name:JOHN},{id:2,name:SMITH}]}.

The following example describes an input query to get any relation between App and User if and only if a relation of type OPRT exists between them. In some embodiments, the input query can be formulated as "Select A.B from App A, User B where A.B=OPRT." In this case A.B denotes the relation between the App and User objects and the "where" condition defines the relationship type. A.B=OPRT indicates the relationship name as OPRT. Therefore, B is not an attribute of A. A and B are the two separate objects and A.B indicates the relation between them. In some embodiments, the input query is converted as follows in different databases:
Neo4j: MATCH (A:App)-[relAB:OPRT]-(B:User) MATCH (A)-[r]-(B) RETURN r
In this example, the response to the above query is an array of objects with start node and end node id's and a set of relations between them. It may be denoted by
{"data":[{A:{id:1},B:{id:2},relations:[OPRT,DEVELOP, USES]} . . . {A:{id:3},B:{id:6},relations:[LIKES, BOUGHT,DEBUG]}]}.

The following example describes an input query to get the property "text" of any object of type "App" where there exists a relation between object App and object user of type KNW. In some embodiments, the input query can be formulated as "select A.text from App A, User B where A.B=KNW." In this query even though "text" is an attribute of object A, the compiler comprehends that it's not of any "A" but of specific "A" for which it has some relation with object B of kind KNW. In some embodiments, the input query is transformed as follows in different databases:
Neo4j: MATCH (A:App)-[relAB:KNW]-(B:User) RETURN A.text
In this example, the response to the above query is an array of node objects with a property "id" and a property "text". It may be denoted by {"data":[{id:1,text:hi}, {id:2,text: hello} . . . ]}.

The following example describes an input query to get all the relation between [App, User] and [User, Customer], if there exists a relation "USES" between App and User and ONLINE between User and Customer. In some embodiments, the input query can be formulated as "Select A.B.C from App A, User B, Customer C where A.B=USES AND B.C=ONLINE." In some embodiments, the input query is transformed as follows in different databases:
Neo4j: MATCH (A:App)-[relAB:USES]-(B:User)-[relBC: ONLINE]-(C:Customer)MATCH(A)-[relAB_ALL]-(B)-[relBC_ALL]-(C) RETURN relAB_ALL, relBC_ALL
In this example, the response to the above query may be an array of objects with start node (of type A, B) and end node id's (of type B, C) and a set of relations between them. It may be denoted by
{"data":[{A:{id:1},B:{id:2},relations:[OPRT,DEVELOP, USES]} . . . {B:{id:3},C:{id:6},relations:[LIKES, BOUGHT,DEBUG]}]}.

The following example describes an input query to select the properties of a relation in a graph database. In some embodiments, the input query can be formulated as "Select A.B. * from App A, User B where A.name=JOHN AND B.name=ANDROID." In some embodiments, the input query is transformed as follows in different databases:
Neo4j: MATCH (A:App)-[r]-(B:User) WHERE A.name=JOHN AND B.name=ANDROID RETURN r
In this example, the response to the above query is an array of objects having properties employee name and his department id. It is denoted by
{"data":[{r:{label:KNW,status:1,id:1}} . . . ]}.

The following example describes an input query to implement "AND" and "OR" operation. In some embodiments, the input query can be formulated as "select a.name from App a where a.id BETWEEN 1 AND 10." The former query tells that select all objects of type App where ID is in the range 1-10. In some embodiments, the input query is transformed as follows in different databases:
MongoDB: db.App.find({\"name\":{\"$gte\":1,\"$lt\":10}},{name=1})
Neo4j: MATCH (a:App) WHERE a.name BETWEEN [1,10] RETURN a.name
SQL: select name from App where id BETWEEN 1 AND 10.
HIVE: select name from App where id BETWEEN 1 AND 10.
In this example, the response to the above query may be an array of objects with property name.
It may be denoted by {"data":[{A:{name: GOOGLE}}, {A:{name: FACEBOOK}} ... ]}.

The following example describes an example of a multiple flavor of SQL operator. The below query says get the name of the app where its name is either "JOHN" or "'SMITH" and the developer of app is 'TOM'. In some embodiments, the input query can be formulated as "select a.name from App a where a.name IN ('JOHN','SMITH') AND a.developer='TOM'" In some embodiments, the input query may be transformed as follows in different databases.
MongoDB: db.App.find({\"$and\":[{\"name\":{\"$in\":\"[JOHN,SMITH]\"}},{\"developer\":{\"$eq\":\"TOM\"}}]},{name=1})
Neo4j: MATCH (a:App) WHERE (a.name IN [JOHN, SMITH] AND a. developer=TOM) RETURN a.name
SQL: select name from App where name IN ('JOHN', 'SMITH') AND developer=TOM
HIVE: IN not supported.

The following example describes an input query for a combination of "AND" and "OR" query. In some embodiments, the input query may be formulated as "select a.name from App a where (a.name IN ('JOHN','SMITH') AND a.developer='TOM') OR a. developer='JACK'." The former query tells to fetch the name of all App where name is either "JOHN" or "SMITH" and developer is "TOM" or developer is "JACK". In some embodiments, the input query is transformed as follows in different databases:
MongoDB:
db.App.find({\"$or\":[{\"$and\":[{\"name\":{\"$in\":\"[JOHN,SMITH]\"}},{\"developer\":{\"$eq\":\"TOM\"}}]},{\"developer\":{\"$eq\":\"JACK\"}}]},{name=1});
Neo4j: MATCH (a:App) WHERE ((a.name IN [JOHN, SMITH] AND a.developer=TOM) OR a.developer=JACK) RETURN a.name
SQL: select name from App where (name IN ('JOHN', 'SMITH') AND developer='TOM') OR developer='JACK'
HIVE: IN query not supported
In this example, the response to the above query may be an array of objects with property name.
It may be denoted by {"data":[{A:{name: JOHN}}, {A:{name: FACEBOOK}} ... ]}.

The following example describes an input query for SQL NULL and NOT NULL query. In some embodiments, the input query can be formulated as "Select A.name from Application A where A.name IS NOT NULL." The former query tells to fetch all the names of Application which is not null. In some embodiments, the input query is transformed as follows in different databases:
MongoDB: db. Application.find({\"name\":{\"$neq\":\"NULL\"}},{name=1})
NEO4j: MATCH (A:Application) WHERE A.name IS NOT NULL RETURN A.name
SQL: select name from Application where name IS NOT NULL
HIVE: select name from Application where name IS NOT NULL
In this example, the response to the above query may be an array of objects with property name.
It may be denoted by {"data":[{A: {name: JOHN}}, {A:{name: FACEBOOK}} ... ]}.

The following example describes an input query that tells to fetch all "Application" objects whose name attributes are NULL. In some embodiments, the input query can be formulated as "select A.appname from Application A where A.name IS NULL." In some embodiments, the input query may be transformed as follows in different databases:
MongoDB: db. Application.find({\"name\":{\"$eq\":\"NULL\"}},{appname:1})
Neo4j: MATCH (A:Application) WHERE A.name IS NULL RETURN A.appname
SQL: select appname from Application where name IS NULL
HIVE: select appname from Application where name IS NULL
In this example, the response to the above query may be an array of objects with property name.
It may be denoted by {"data": [{A: {appname: JOHN}}, {A:{appname: FACEBOOK}} ... ]}.
The following example describes Create Queries for different databases.
Example 1:
This query creates an App object with property "name" and its value as "JOHN".
"create App A with values{name:JOHN}" Transformed query: The above query may be converted as follows in different databases:
MongoDB: db.App.insert({\"name\":\"JOHN\"})
Neo4j: CREATE (A:App{"name":"JOHN"}) RETURN A.
SQL: Insert into App values (JOHN)
HIVE: Insert into Table App values (JOHN)
Example 2:
These are some of the example specific to a graph database "Neo4j" addressed by this method. The following syntax throws error for other database as other database do not run on the concept of creating node and relation for node.
i) Create a node without any properties
    "Create Application A"
    Neo4j: CREATE(A:Applicatio) RETURN A
ii) Create a relation between two nodes
    "Create A.B=KNW with values {id:1} from App A, User B where A.dev="JOHN" AND B.name="SMITH"
    Neo4j: MATCH (A:App{dev:JOHN}),(B:User{name: SMITH}) CREATE(A)-[relKNOW:KNOW{id:1}]-> (B) RETURN relKNOW
The following example describes Update Queries for different databases.
Example 1:
Update property of an object. The example shows how to update properties of an object.
"update App A set A.name="JOHN""
Transformed query: The above query is converted as follows in different databases:
MongoDB: db.App.update(null, {"$set":{"name": "JOHN"}},false,true, [write-concern])
In this method, first parameter is a condition, second parameter is data, third parameter is "upsert" which adds a new parameter if it do not exist, next parameter is "multi" which allows multiple row update and last parameter is "write concern."
Neo4j: Match (A: App) where set A. name+"JOHN" return A;
SQL: update App set name="JOHN"
HIVE: update App set name="JOHN"
Example 2: Update Property of an Object Under Certain Criteria
"Update App A set A.status=1,A.add="new addr" where A.name="JOHN"
Transformed query: The above query is converted as follows in different databases:
MongoDB: db. App.update({"name":"JOHN"}, {"$set": {"status":1,add="new addr"}},false,true,[write-concern])
Neo4j: Match (A: App) where A.name="JOHN" set A.status=1, A.add="new addr" return A;
SQL: update App set status=1, add="new add" where name="JOHN"
HIVE: update App set status=1, add="new addr" where name="JOHN".
Example 3: Updating Two Node Objects of a Graph Database by Adding a New Relation Between them.
"update App A, User B set A.B='relation2'"
Transformed query: The above query is converted as follows in different databases:
Neo4j: MATCH (A:App),(B:User)
CREATE (A)-[rel: relation2]->(B) RETURN rel
Example 4: Update an Existing Relation to a New Relation.
"Update App A, User B set A.B="relation2" where A.B='relation1'"
Transformed query: The above query is converted as follows in different databases:
Neo4j: MATCH (A:App)-[rel: relation1]-(B:User)
Set rel: relation2
RETURN rel
Example 5: Update a Property of a Relation Between Two Nodes Under Certain Constraint.
"Update App A, User B set A.B.status=2 where A.B="relation1" AND A.B.status>1"
Neo4j: MATCH (A:App)-[rel: relation1]-(B: User)
Where rel.status>1
Set rel.status=2 RETURN rel
Response: The common response of create update query is as follows:
{"data":{"ack":"success/failure message"}}
Example 6:
This example explains the upsert query, i.e. if the specific property does not exist in an object, than a new property will be added to the object.

---

"upsert App A set A.name = "JOHN" where A.id=1"
MongoDB: db.App.update({"id":1},{"$set":{"name":"JOHN"}},true,-true,[write-concern])
Neo4j: Match (A: App) where A.id =1    set A.name = "JOHN" return A;
SQL: The sql query executes in two phase in this case.
Phase 1: count: = select count (name) from App where id=1;
Phase II:
If (count > 0)
  "update App set name="JOHN" where id=1"
Else{
  "insert into App(id,name) values(1, "JOHN")"
}

---

The following example describes Count Queries for different databases.
Example 1:

This example explains the count query, which gives the count of number of occurrence of a particular object in a list of object.
Count the occurrence of a specific type of object in a list of objects.
"count * from App A where A.name="SMITH""
This query tells to get all the objects whose name is "SMITH".
MongoDB: db.App.find({name:SMITH}).count( )
Neo4j: Match (A: App) where A.name="SMITH" RETURN count(A)
SQL: Select count(*) from App where name="SMITH"
HIVE: Select count(*) from App where name="SMITH"
Response: The response of the above query is as follows {"data":{"count":"5"}}
The following example describes Join Queries for different databases.
Example 1
This object explains the join queries.
INNER JOIN: Select Employee name and his corresponding matching department.
"Select A.name, B.id from Emp A, Department B where A.dep_id=B.dep_id"
Neo4j: MATCH (A:Emp), (B:Department) WHERE A.dep_id=B.dep_id RETURN A.name, B.id
SQL: Select Emp.name, Department.id from Emp Inner Join Department ON Emp .dep_id=Department .dep_id
HIVE: Select Emp.name, Department.id from Emp Join Department ON (Emp .dep_id=Department .dep_id)
LEFT OUTER JOIN: Select all Employee attributes and department id from Employee and its department.
"select Emp *.name, B.id from Emp A, Department B where A.dep_id=B.dep_id"
SQL: Select Emp.name, Department.id from Emp Left Join Department ON Emp .dep_id=Department .dep_id
HIVE: Select Emp.name, Department.id from Emp Left Join Department ON (Emp .dep_id=Department .dep_id)
RIGHT OUTER JOIN: Select Employee name and all department attributes from Employee and its department.
"select Emp E.name, Department *.id from Emp A, Department B where A.dep_id=B.dep_id"
SQL: Select Emp.name, Department.id from Emp right Join Department ON Emp .dep_id=Department .dep_id
HIVE: Select Emp.name, Department.id from Emp right Join Department ON (Emp. dep_id=Department .dep_id)
FULL JOIN: Select all Employees and its department attributes from Employee and its department.
"select Emp *.name, Department *.id from Emp A, Department B where A.dep_id=B.dep_id"
SQL: Select Emp.name, Department.id from Emp full Join Department ON Emp .dep_id=Department .dep_id
HIVE: Select Emp.name, Department.id from Emp full Join Department ON (Emp .dep_id=Department .dep_id)
The following example describes Distinct Queries for different databases.
Example 1:
This example shows the implementation of distinct query in Open Query language.
"Select unique A.name from App A"
Neo4j: Match (n1:App) return DISTINCT n1.name;
MongoDB: db.App.distinct("name")
SQL: Select DISTINCT name from App.
HIVE: Select DISTINCT name from App
The following example describes Iterative Queries for different databases.
Example 1:

This query shows the implementation of iterative query in Open Query Language.

"select A.name from App A where A.id IN(select B. id from App2 B where B.name="ANDROID")".

MongoDB: Iterative query are executed in two phases in mongodb, in first phase inner query is resolved and in the next phase top query is executed.

Phase I:
Array A=db.App2.find({name:ANDROID},{id:1})
Phase II:
db.App1.find{id:{$in:A}},{name:1})
Neo4j: Match (n2:App2) with n2 where n2.name="ANDROID" Match (n1:App1) where n1.id IN n2.ID
SQL: "select name from App1 where id IN(select id from App2 where name="ANDROID")"
HIVE: "select name from App1 where id IN(select id from App2 where name="ANDROID")."

Figure 6A:
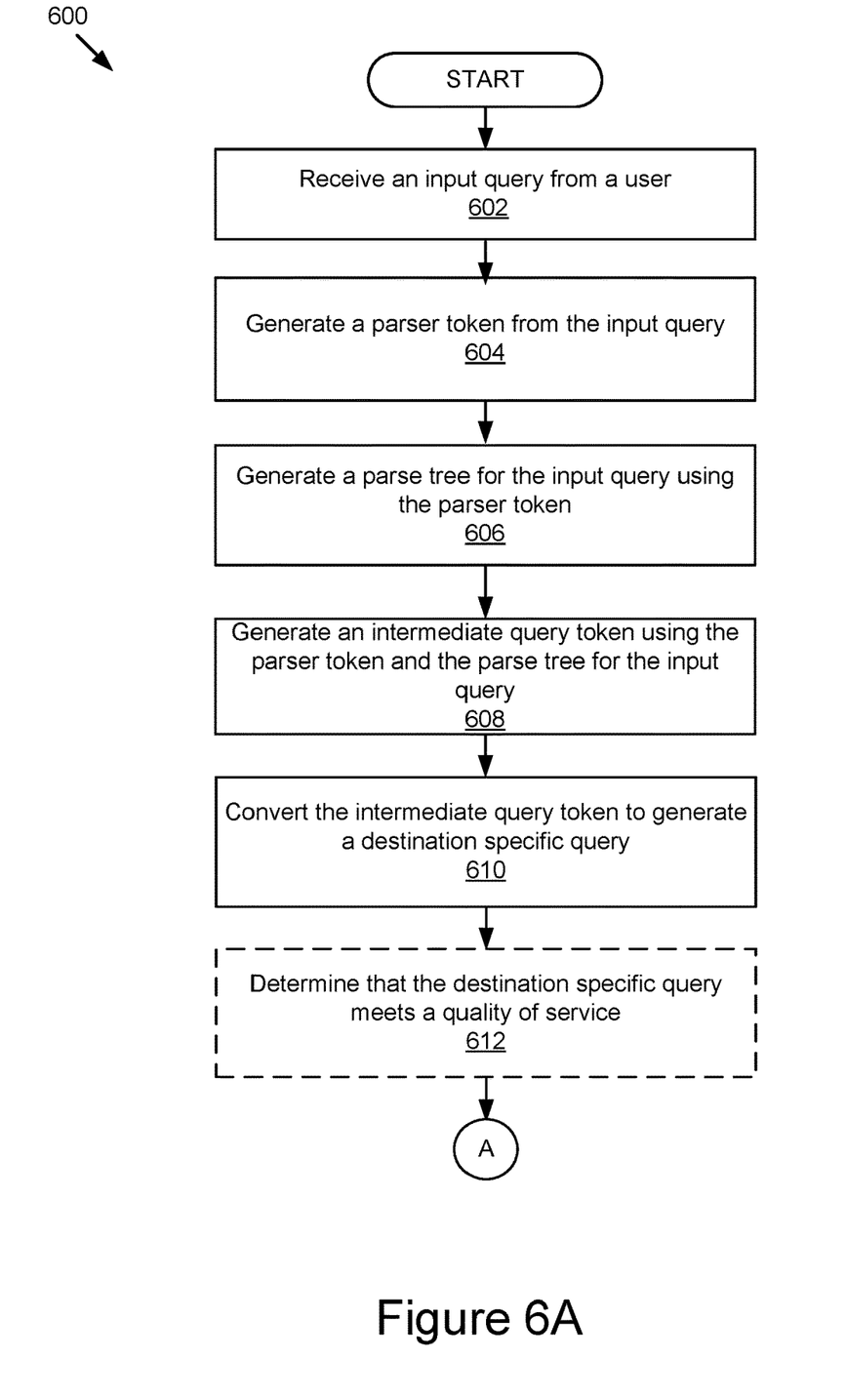
FIGS. 6A and 6B depict a flow diagram illustrating one embodiment of a method to generate a platform independent response to an input query.
Figure 6B:
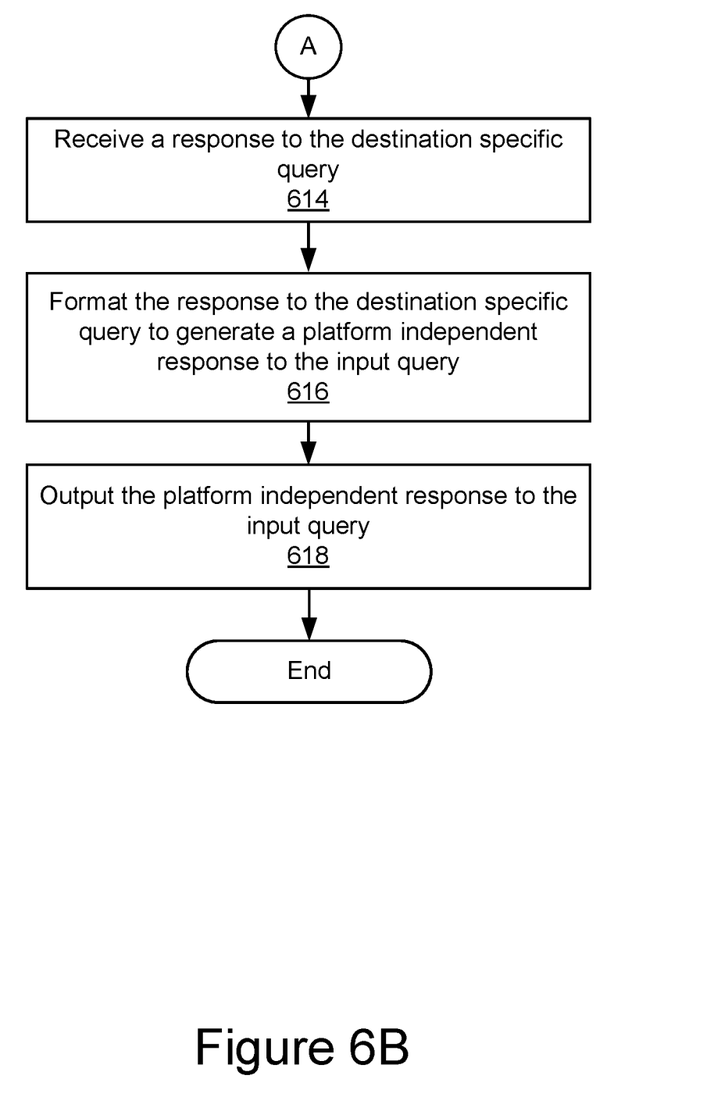

FIGS. 6A and 6B are a flow diagram 600 illustrating an embodiment of a method to generate a platform independent response to the input query. As described above, the query parsing application 103 may include a compiler 201, an intermediate query generator module 203, a destination specific query module 205, a quality manager module 207, and a response data formatter module 209. The controller 201 may include a lexical analysis module 301, a syntax analysis module 303, and a semantic analysis module 305. In FIG. 6A, the compiler 201 receives 602 an input query from a user. At 604, the lexical analysis module 301 generates a parser token from the input query. The lexical analysis module 301 also identifies a plurality of valid words in the input query. The lexical analysis module sends the parser tokens to the syntax analysis module 303. At 606, the syntax analysis module 303 generates a parse tree for the input query using the parser token. The syntax analysis module 303 also determines whether the parser toke is syntactically correct. In some embodiments, the syntax analysis module 303 can send the parser token and the parse tree to the intermediate query generator module 203. In some embodiments, the semantic analysis module 305 additionally performs a semantic validation of the input query. At 608, the intermediate query generator module 203 generates an intermediate query token using the parse token and the parse tree for the input query. At 610, the destination specific query module 205 converts the intermediate query token to generate a destination specific query. In some embodiments, the destination specific query module 205 sends the destination specific query to a quality manager module 207. In other embodiments, the destination specific query module 205 sends the destination specific query without a quality check. At 612, the quality manager module 207 optionally determines that the destination specific query meets a quality of service. For example, the quality of service includes a read quality and a write quality for the destination specific query.

Referring now to FIG. 6B, at 614, the destination specific query module 205 receives a response to the destination specific query. In some embodiments, the destination specific query module 205 sends the response to the destination specific query to the response data formatter module 209. At 616, the response data formatter module 209 formats the response to the destination specific query to generate a platform independent response to the input query. For example, the response data formatter module 209 formats the response the destination specific query to generate a response in a unified JSON format. At 618, the response data formatter module 209 outputs the platform independent response to the input query.

A system and method for generating a platform independent response to an input query has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
receiving, by one or more processors, an input query from a user;
generating, by the one or more processors, an intermediate query token from the input query;
converting, by the one or more processors, the intermediate query token to a destination specific query, by mapping an object in the input query to one or more concepts in one or more databases, wherein the destination specific query includes a quality of service parameter indicating a category of quality of service for a specific operation, the specific operation comprising at least one of: a database read operation and a database write operation;
determining whether a condition to use a secondary server for the specific operation is identified, wherein the condition is determined based on the category of quality of service;
in response to the determining, enforcing, by the one or more processors, quality of service defined by the quality of service parameter during execution of the destination specific query, further comprising using either a primary server or the secondary server for the specific operation;
receiving, by the one or more processors, a response to the destination specific query; and
formatting, by the one or more processors, the response to the destination specific query to generate a platform independent response to the input query.

2. The method of claim 1, further comprising:
identifying a plurality of valid words in the input query; and
generating a parser token using the plurality of valid words in the input query.

3. The method of claim 2, further comprising:
determining that the parser token is syntactically correct; and
generating a parse tree for the input query using the parser token.

4. The method of claim 3, further comprising:
generating the intermediate query token using the parser token and the parse tree for the input query.

5. The method of claim 1, further comprising:
determining a query type of the input query; and
wherein generating the intermediate query token includes identifying a rule corresponding to the query type of a plurality of query types and determining one or more parameters of the intermediate query token based on the rule.

6. The method of claim 1, wherein the quality of service includes a read quality and a write quality for the destination specific query.

7. The method of claim 1, further comprising:
computing a semantic validation of the input query.

8. A system comprising:
one or more processors;
a memory storing instructions, which when executed by the one or more processors, cause the one or more processors to:
receive an input query from a user;
generate an intermediate query token from the input query;
convert the intermediate query token to a destination specific query, by mapping an object in the input query to one or more concepts in one or more databases, wherein the destination specific query includes a quality of service parameter indicating a category of quality of service for a specific operation, the specific operation comprising at least one of: a database read operation and a database write operation;
determine whether a condition to use a secondary server for the specific operation is identified, wherein the condition is determined based on the category of quality of service;
in response to the determining, enforce quality of service defined by the quality of service parameter during execution of the destination specific query, further comprising using either a primary server or the secondary server for the specific operation;
receive a response to the destination specific query; and
format the response to the destination specific query to generate a platform independent response to the input query.

9. The system of claim 8, wherein the instructions cause the one or more processors to:
identify a plurality of valid words in the input query; and
generate a parser token using the plurality of valid words in the input query.

10. The system of claim 9, wherein the instructions cause the one or more processors to:
determine that the parser token is syntactically correct; and
generate a parse tree for the input query using the parser token.

11. The system of claim 10, wherein the instructions cause the one or more processors to:
generate the intermediate query token using the parser token and the parse tree for the input query.

12. The system of claim 8, wherein the instructions cause the one or more processors to:
determine a query type of the input query; and
wherein generating the intermediate query token includes identifying a rule corresponding to the query type of a plurality of query types and determining one or more parameters of the intermediate query token based on the rule.

13. The system of claim 8, wherein the quality of service includes a read quality and a write quality for the destination specific query.

14. The system of claim 8, wherein the instructions cause the one or more processors to:
compute a semantic validation of the input query.

15. A non-transitory computer-readable medium storing instructions which, when executed by one or more processors, cause the one or more processors to:
receive an input query from a user;
generate an intermediate query token from the input query;
convert the intermediate query token to a destination specific query, wherein the destination specific query, by mapping an object in the input query to one or more concepts in one or more databases, includes a quality of service parameter indicating a category of quality of service for a specific operation, the specific operation comprising at least one of: a database read operation and a database write operation;
determine whether a condition to use a secondary server for the specific operation is identified, wherein the condition is determined based on the category of quality of service;
in response to the determining, enforce quality of service defined by the quality of service parameter during execution of the destination specific query, further comprising using either a primary server or the secondary server for the specific operation;
receive a response to the destination specific query; and
format the response to the destination specific query to generate a platform independent response to the input query.

16. The non-transitory computer-readable medium of claim 15, wherein the instructions cause the one or more processors to:
identify a plurality of valid words in the input query; and
generate a parser token using the plurality of valid words in the input query.

17. The non-transitory computer-readable medium of claim 16, wherein the instructions cause the one or more processors to:
determine that the parser token is syntactically correct; and
generate a parse tree for the input query using the parser token.

18. The non-transitory computer-readable medium of claim 17, wherein the instructions cause the one or more processors to:
generate the intermediate query token using the parser token and the parse tree for the input query.

19. The non-transitory computer-readable medium of claim 15, wherein the instructions cause the one or more processors to:
determine a query type of the input query; and
wherein generating the intermediate query token includes identifying a rule corresponding to the query type of a plurality of query types and determining one or more parameters of the intermediate query token based on the rule.

20. The non-transitory computer-readable medium of claim 15, wherein the quality of service includes a read quality and a write quality for the destination specific query.

* * * * *